(12) United States Patent
Nandan et al.

(10) Patent No.: US 12,105,653 B2
(45) Date of Patent: Oct. 1, 2024

(54) SYSTEMS, METHODS, AND APPARATUS TO ENABLE DATA AGGREGATION AND ADAPTATION IN HARDWARE ACCELERATION SUBSYSTEMS

(71) Applicant: Texas Instruments Incorporated, Dallas, TX (US)

(72) Inventors: Niraj Nandan, Plano, TX (US); Rajasekhar Reddy Allu, Plano, TX (US); Brian Chae, Duluth, GA (US); Mihir Mody, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/190,242

(22) Filed: Mar. 27, 2023

(65) Prior Publication Data

US 2023/0229610 A1    Jul. 20, 2023

Related U.S. Application Data

(63) Continuation of application No. 17/139,970, filed on Dec. 31, 2020, now Pat. No. 11,615,043.

(Continued)

(51) Int. Cl.
*G06F 13/28* (2006.01)
*G06F 9/48* (2006.01)
(Continued)

(52) U.S. Cl.
CPC ............ *G06F 13/28* (2013.01); *G06F 9/4881* (2013.01); *G06F 13/1673* (2013.01); *G06F 13/4027* (2013.01); *G06F 2213/0038* (2013.01)

(58) Field of Classification Search
None
See application file for complete search history.

(56) References Cited

U.S. PATENT DOCUMENTS 7,460,473 B1    12/2008   Kodama et al.
7,743,216 B2 *   6/2010   Lubbers ............. G06F 12/0862
                                                          711/137

(Continued)

FOREIGN PATENT DOCUMENTS

WO    2004111839 A1    12/2004
WO    2018044484 A1     3/2018

OTHER PUBLICATIONS

International Search Report for PCT/US2021/012067 mailed Apr. 15, 2021.

*Primary Examiner* — Michael Sun
(74) *Attorney, Agent, or Firm* — Michael T. Gabrik; Frank D. Cimino

(57) ABSTRACT

Methods, apparatus, systems, and articles of manufacture are disclosed herein to enable data aggregation and pattern adaptation in hardware acceleration subsystems. In some examples, a hardware acceleration subsystem includes a first scheduler, a first hardware accelerator coupled to the first scheduler to process at least a first data element and a second data element, and a first load store engine coupled to the first hardware accelerator, the first load store engine configured to communicate with the first scheduler at a superblock level by sending a done signal to the first scheduler in response to determining that a block count is equal to a first BPR value and aggregate the first data element and the second data element based on the first BPR value to generate a first aggregated data element.

20 Claims, 8 Drawing Sheets

Related U.S. Application Data

(60) Provisional application No. 62/956,383, filed on Jan. 2, 2020.

(51) Int. Cl.
*G06F 13/16* (2006.01)
*G06F 13/40* (2006.01)

(56) References Cited

U.S. PATENT DOCUMENTS

| | | | | |
|---|---|---|---|---|
| 8,291,185 | B2* | 10/2012 | Na | G06F 3/0647 |
| | | | | 711/156 |
| 9,208,071 | B2* | 12/2015 | Talagala | G06F 3/0619 |
| 10,296,393 | B2 | 5/2019 | Nandan et al. | |
| 10,331,445 | B2 | 6/2019 | Fowers et al. | |
| 10,489,206 | B2 | 11/2019 | Sanghvi et al. | |
| 10,776,167 | B2 | 9/2020 | Nandan et al. | |
| 10,908,946 | B2 | 2/2021 | Sanghvi et al. | |
| 11,029,958 | B1 | 6/2021 | Zhang et al. | |
| 2009/0216958 | A1 | 8/2009 | Biles et al. | |
| 2013/0226535 | A1* | 8/2013 | Tuan | G06F 30/367 |
| | | | | 703/2 |
| 2015/0046673 | A1* | 2/2015 | Barry | G06F 1/3287 |
| | | | | 712/7 |
| 2017/0206169 | A1 | 7/2017 | Coppola et al. | |
| 2018/0189105 | A1 | 7/2018 | Sanghvi et al. | |
| 2019/0018815 | A1* | 1/2019 | Fleming | G06F 9/5027 |

* cited by examiner

SYSTEMS, METHODS, AND APPARATUS TO ENABLE DATA AGGREGATION AND ADAPTATION IN HARDWARE ACCELERATION SUBSYSTEMS

RELATED APPLICATION

This application is a continuation of U.S. patent application Ser. No. 17/139,970, filed Dec. 31, 2020, which claims the benefit of and priority to U.S. Provisional Patent Application No. 62/956,383, filed Jan. 2, 2020, each of which is hereby incorporated herein by reference in its entirety.

FIELD OF THE DISCLOSURE

This disclosure relates generally to hardware acceleration subsystems, and, more particularly, to enhanced external memory transfer and pattern adaptation in hardware acceleration subsystems.

BACKGROUND

While central processing units (CPUs) have improved to meet the demands of modern applications, computer performance remains limited by the substantial amounts of data that must be processed simultaneously by the CPU. Hardware accelerator sub-systems may provide improved performance and/or power consumption by offloading tasks from a computer's central processing unit (CPU) to hardware components that specialize in performing those tasks.

Figure 1:
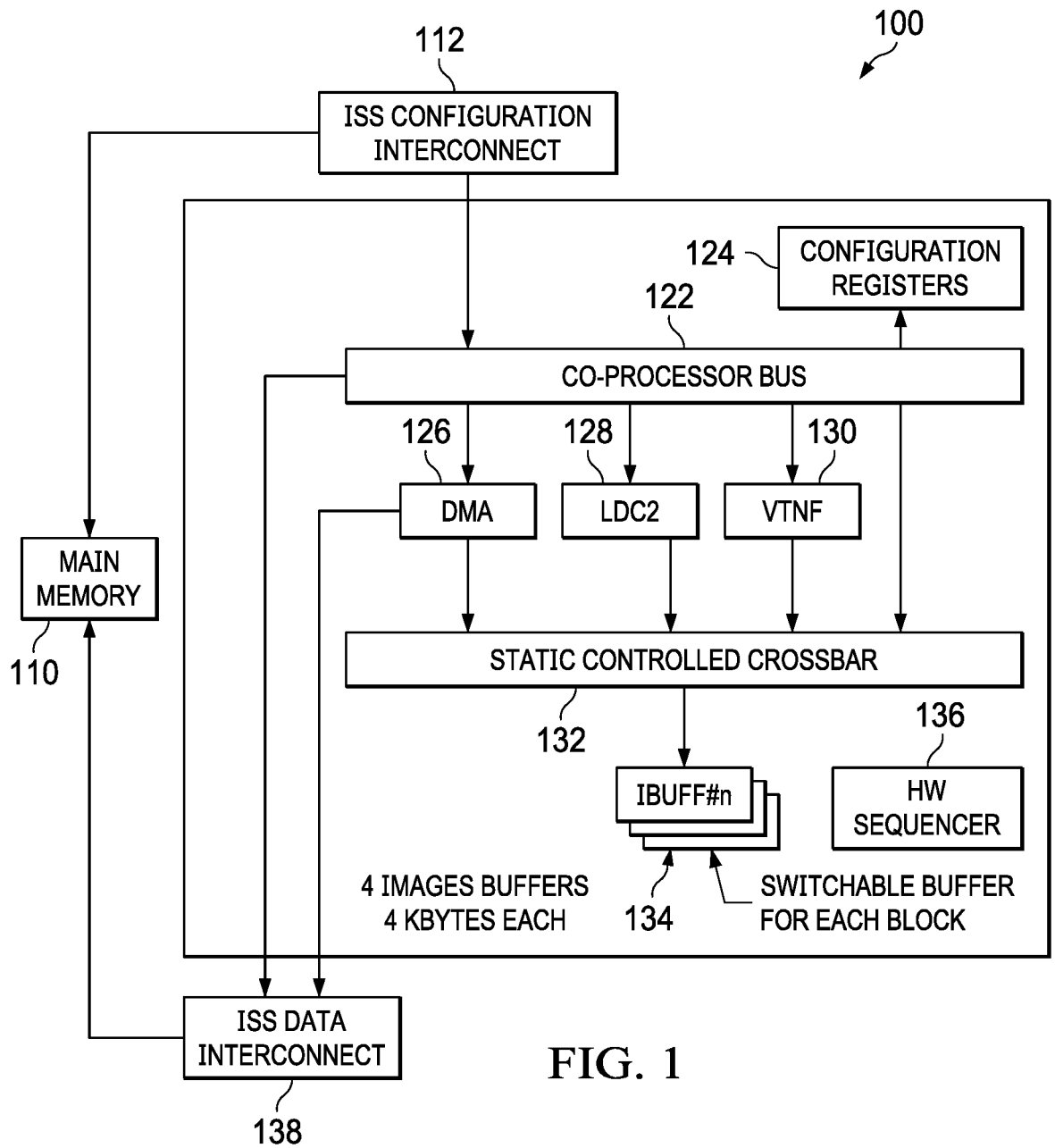
FIG. 1 is an example diagram of a block-based processing and storage subsystem to perform processing tasks on macroblocks fetched from external memory.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

In some cases, hardware acceleration can be used to decrease latency, increase throughput, reduce power consumption, and enhance parallelization for computing tasks. Commonly used hardware accelerators include graphics processing units (GPUs), field-programmable gate arrays (FPGAs), application-specific integrated circuits (ASICs), complex programmable logic devices (CPLDs), and Systems on a Chip (SoC).

Hardware acceleration has various applications across many different fields including the automotive industry, advanced driver system (ADAS), manufacturing, high performance computing, robotics, drones, and other industries involving complex, high-speed processing, e.g., hardware-based encryption, computer generated graphics, artificial intelligence, and digital image processing, the latter of which involves various complex processing operations performed on a single image or video stream, for example, lens distortion correction, scaling, transformations, noise filtering, dense optical flow, pyramid representation, stereo screen door effect (SDE), and other processing operations. Many of the computing tasks associated with these operations involve large amounts of processing power, and in some cases, such as processing video streams in real time, the amount of processing power needed to process the image or video stream may cause significant strain on the CPU.

Many hardware accelerators are designed to perform various computing tasks on data fetched from external memory. Typically, hardware accelerators are configured to perform processing tasks on data elements in the form of blocks or lines. For example, in image processing where imaging/vision algorithms are often two-dimensional (2D) block-based, the hardware accelerators may be configured to process two-dimensional blocks from an image frame rather than processing the entire image frame as lines. Various example hardware accelerators may operate on block sizes of 16×16 bytes, 32×32 bytes, and 64×32 bytes.

If the hardware accelerator is implemented on a System on a Chip (SoC), a direct memory access (DMA) controller may implement direct memory access to fetch the data blocks or data lines from the external memory and transfer the data to the local on-chip memory. Many types of external memory, such as double data rate synchronous dynamic random access memory (DDR SDRAM), prefer one-dimensional (1D) line-based linear data access because line transfers may not incur page penalties, which may occur, for example, when two page open/close cycles are required to access vertical neighboring pixels landing on different pages (each page open/close cycle has a duration, e.g., a page penalty, of about 60 ns).

While DDR external memory prefers linear access, the DMA controller may access data in the form of blocks from the DDR external memory; however, the data blocks sent by the DDR external memory are typically fixed-size rectangular blocks with a block height corresponding to the numbers of lines in the DMA data block request and a fixed block width of 64 bytes. In some cases, the fixed-size rectangular blocks sent by the DDR may have a block height managed by an external memory controller and/or a block width that is a function of burst size. Because hardware accelerators may frequently operate on data lines or data blocks that are smaller than the data blocks sent by the DDR external memory, the DMA controller may use only a small portion of the data block sent by the DDR and discard the excess data, which, in many cases, must be re-fetched from the DDR external memory at a later time for processing. As a result, the DDR external memory might send the same data to the DMA controller multiple times before the data is processed by the hardware accelerator. Likewise, the DMA controller may send processed data to the DDR external memory multiple times before the processed data is stored in the DDR external memory. This redundancy creates inefficiencies in the operation of the DDR external memory.

For example, if the DMA controller attempts to fetch a 16×16 byte data block from the DDR external memory, e.g., a data block with a block height of 16 lines and a block width of 16 bytes, the DDR external memory may return a larger data block, typically a 16×64 byte data block, e.g., a data block with a block height of 16 lines and a block width of 64 bytes. The external memory controller may write only 16 bytes out of each of the 16 lines and discard the remaining 48 bytes, thus resulting in a DDR memory access efficiency of 25%. Likewise, if the DMA controller attempts to write a 16×16 byte data block to the DDR external memory, the DMA may effectively consume the bandwidth and time of writing 16 lines of 64-bytes. Thus, DDR inefficiencies may occur when fetching data from the DDR external memory and/or writing data to the DDR external memory.

While some hardware accelerators operate on data blocks as described above, other hardware accelerators may operate on data lines. Multiple hardware accelerators can be integrated into a hardware acceleration sub-system to form a hardware acceleration chain, however, because line-to-block and block-to-line conversion becomes increasingly complex when implemented on a hardware accelerator, the hardware accelerators in existing subsystems operate on the same type of data element, e.g., block or line. This limitation renders customization of hardware acceleration subsystems substantially difficult.

Prior techniques for improving efficiency of memory access by hardware accelerators are typically limited to the fixed block size scheme with or without software and/or hardware based caching, resulting in inefficient transfers and simple linear hardware acceleration use-case chain construction. These prior techniques include hardware acceleration subsystems that fetch fixed-size macroblocks from the external memory. For example, FIG. 1 is an example diagram of a block-based processing and storage subsystem that includes an image subsystem (ISS) 100 which is configured using configuration interconnect 112 configured to fetch fixed-size macroblocks from system memory 110 via an ISS Data Interconnect 138 and store them in local on-chip memory, such as, for example a switchable buffer from the set of switchable buffers 134. A lens distortion correction (LDC2) hardware accelerator 128 and/or a noise filtering (VTNF) hardware accelerator 130 may perform processing tasks on the macroblocks and send the processed macroblocks to local memories such as, for example switchable buffers from the set of switchable buffers 134 via a static controller crossbar 132. These existing hardware acceleration sub-systems, however, may not include hardware that allows the sub-system to adjust the size of the macroblock according to the needs of the individual hardware accelerators. Rather, the size of the macroblock in these sub-systems is mainly driven by the input buffer 134, and the output block size is defined by an input block scaling factor, output image buffer size, and/or input block local memory size. The buffers in these subsystems are often switchable buffers that do not have mechanisms for combining blocks. This lack of control and storage capability in existing hardware acceleration subsystems may limit the flexibility of the subsystems to combine blocks into various sizes. While other hardware accelerators may involve the CPU to combine multiple neighbor blocks to create one bounding-box, the involvement of the CPU often results in area and performance costs in the CPU pipeline.

Figure 2:
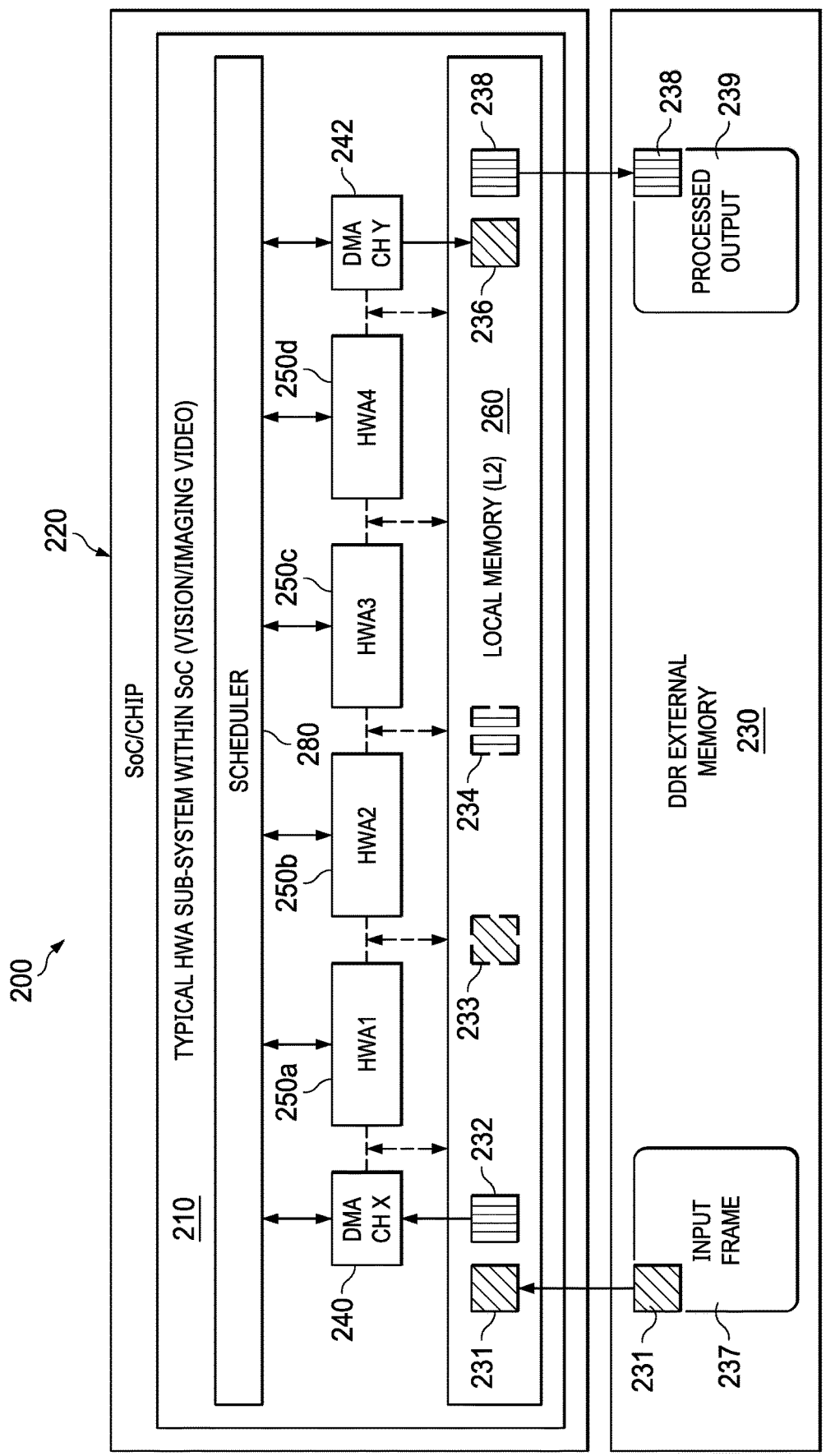
FIG. 2 is an example diagram of a hardware acceleration sub-system to process data elements fetched from external memory.

FIG. 2 is an example diagram 200 of a hardware acceleration subsystem 210 integrated into a System on a Chip (SoC) 220 and configured to fetch data elements 231, 232 from an external memory 230, process the data elements 231, 232 to produce processed data elements 236, 238, and write the processed data elements 236, 238 to the external memory 230.

The hardware acceleration subsystem 210 illustrated in FIG. 2 includes a first direct memory access (DMA) controller 240 to facilitate transfer of the data elements 231, 232 from the external memory 230, e.g., from the input frame 237 stored in the external memory 230, to the local memory 260, a second DMA controller 242 to facilitate transfer of the processed data elements 236, 238 to the external memory 230, e.g., to the output frame 239 of the external memory 230, from the local memory 260 and/or hardware accelerators 250a, 250b, 250c, 250d, four hardware accelerators 250a, 250b, 250c, 250d to perform various processing tasks on the data elements 231, 232 to produce intermediate data elements 233, 234 and/or processed data elements 236, 238, a local memory 260 to store the data elements 231, 232 and/or intermediate data elements 233, 234 temporarily during processing, and a scheduler 280 to coordinate the workflow between the hardware accelerators 250a-d, the local memory 260, and the DMA controllers 240, 242.

In the example illustrated in FIG. 2, the hardware accelerators 250a-d are configured to consume data elements 231, 232 and/or intermediate data elements 233, 234 as input, perform a processing task on the data elements 231, 232 and/or intermediate data elements 233, 234, and produce the processed data elements 236, 238 as output to be consumed by another hardware accelerator 250a-d, written to the local memory 260, and/or written to the DDR external memory 230 via the DMA controller 242. In the example of FIG. 2, the hardware acceleration subsystem 210 is configured to process multiple data elements 231, 232 in parallel, e.g., a first hardware accelerator 250a performs a first processing task on the first data element 231 to produce intermediate data element 233 while a second hardware accelerator 250b performs a second processing task on the second data element 232 to produce intermediate data element 234. The scheduler 280 facilitates the workflow of the hardware accelerators 250a-d, the DMA controllers 240, 242, and the local memory 260 as the data elements 231, 232 proceed along the hardware acceleration pipeline.

In some examples, an enhanced hardware acceleration sub-system for improving DDR access and enabling data adaption for multiple producers and consumers includes a first hardware accelerator to perform a first processing task on a first data element, a scheduler to control the workflow and data aggregation of the hardware scheduler, and a load store engine coupled to the first hardware accelerator to aggregate the first data element and the second data element in the local memory. In some examples, the scheduler includes a pattern adapter to enable conversion between lines, blocks, and aggregated blocks.

Figure 3:
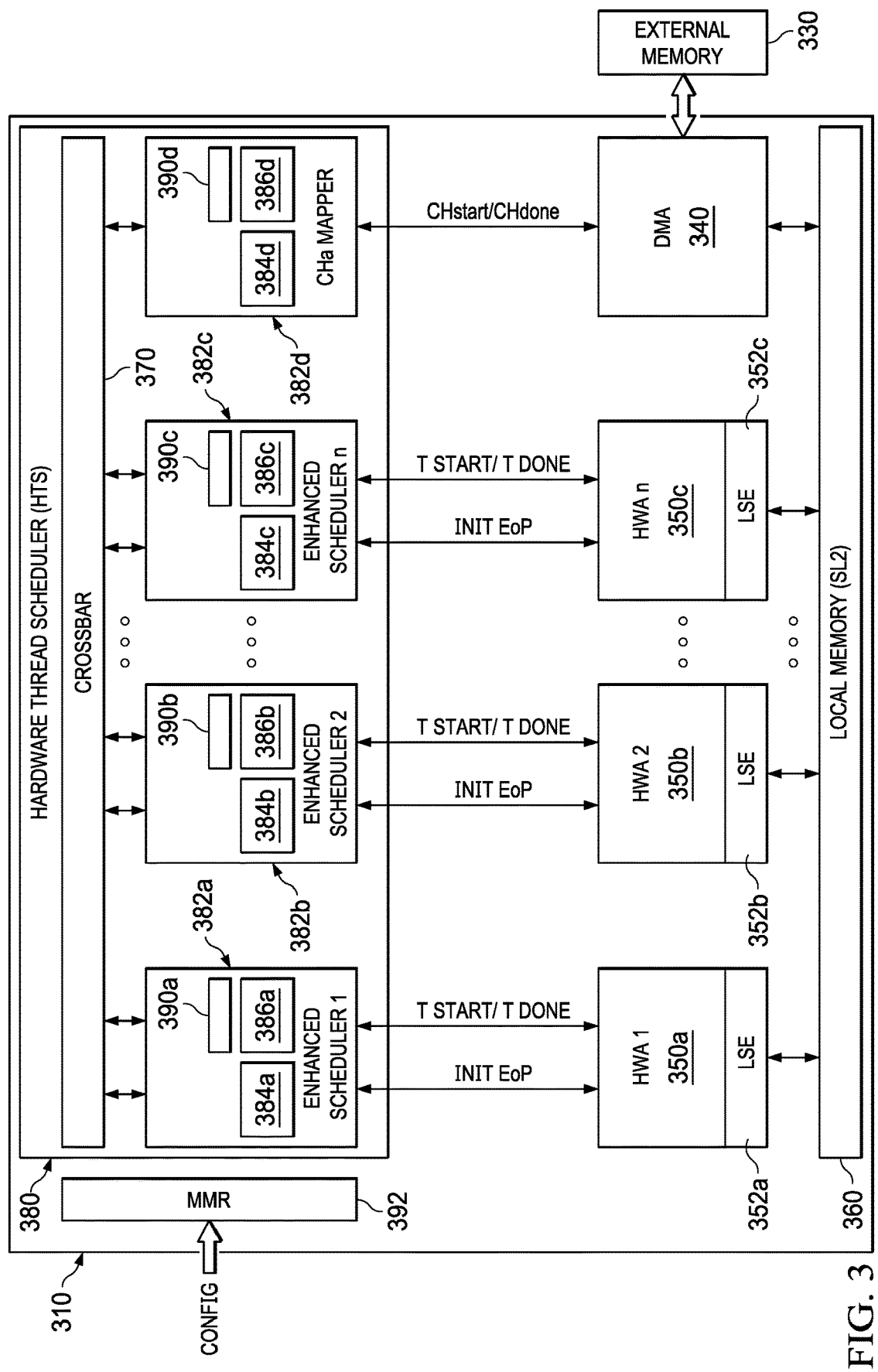
FIG. 3 is a block diagram of an example hardware acceleration subsystem to enable data aggregation and pattern adaptation in hardware acceleration.

FIG. 3 is a block diagram of an example hardware acceleration subsystem 310 to enable data aggregation and pattern adaptation. The example hardware acceleration subsystem 310 includes an example DMA controller 340 coupled to an example channel mapper (e.g., an example DMA scheduler 382d), an example first hardware accelerator 350a coupled to an example first scheduler 382a, an example second hardware accelerator 350b coupled to an example second scheduler 382b, an example third hardware accelerator 350c coupled to an example third scheduler 382c, an example local memory 360, and an example main hardware thread scheduler (HTS) 380. In some examples, the example first hardware accelerator 350a includes an example first load store engine 352a, the example second hardware accelerator 350b includes an example second load store engine 352b, and the example third hardware accelerator 350c includes an example third load store engine 352c. In some examples, the example hardware acceleration subsystem 310 includes an example Memory Mapped Register (MMR) controller 392 coupled to the example HTS 380, the example schedulers 382a-d, the example load store engines 352a-c, and/or the example DMA controller 340. In some examples, the example MMR controller 392 is software (SW) programmable.

In the example hardware acceleration subsystem 310 illustrated in FIG. 3, the example schedulers 382a, 382b, 382c, 382d include example consumer sockets 384a, 384b, 384c, 384d respectively, configured to track input data consumed by a corresponding example hardware accelerators 350a-c and the corresponding example DMA controller 340. In the example hardware acceleration subsystem 310 illustrated in FIG. 3, the example scheduler 382a-d include example producer sockets 386a, 386b, 386c, 386d respectively, configured to track output data produced by the corresponding example hardware accelerators 350a-c and the corresponding example DMA controller 340. In some examples, the example first scheduler 382a includes an example first producer pattern adapter 390a coupled to the example first producer socket 386a, the example second scheduler 382b includes an example second producer pattern adapter 390b coupled to the example second producer socket 386b, the example third scheduler 382c includes an example third producer pattern adapter 390c coupled to the example third producer socket 386c, and the example DMA scheduler 382d includes an example DMA pattern adapter 390d coupled to the example DMA producer socket 386d.

In the example hardware acceleration subsystem 310 illustrated in FIG. 3, the example DMA controller 340 facilitates transfer of data elements, e.g., data blocks, between the example local memory 360 and an example external memory 330, e.g., a DDR external memory or other off-chip memory external to the example hardware acceleration subsystem 310. In some examples, the example DMA controller 340 communicates with an external memory controller, e.g., a DDR controller, to transfer data elements between the example local memory 360 and the example external memory 330. In some examples, the example DMA controller 340 transfers data elements between the example hardware acceleration subsystem 310, the example external memory 330, and/or other components and/or subsystems in the SoC via a common bus.

In some examples, the example DMA controller 340 communicates with the example schedulers 382a-c via an example crossbar 370 and is coupled to an example DMA scheduler 382d. In some examples, the example DMA scheduler 382d performs scheduling operations similar to the example schedulers 382a-c corresponding to the example hardware accelerators 350a-c. In some examples, the example DMA scheduler 382d maps a DMA channel to an example hardware accelerator 350a-c. In some examples, the example DMA controller 340 communicates a channel start signal when a transfer of data is initiated via a DMA channel (e.g., a DMA channel corresponding to a hardware accelerator 350a). In some examples, the example DMA controller 340 communicates a channel done signal when a transfer of data is completed via a DMA channel (e.g., a DMA channel corresponding to a hardware accelerator 350a).

In the example hardware accelerator subsystem 310 illustrated in FIG. 3, the example DMA controller 340 fetches a data element from the example external memory 330 to be consumed by at least one of the hardware accelerators 350*a-c*. In some examples, data elements are stored contiguously in the example local memory buffer 360. In some examples, in response to an instruction from the example schedulers 382*a-d* and/or the example HTS 380, the example DMA controller 340 transfers a processed data element to the example external memory 330, e.g., to an output frame.

In the example hardware accelerator subsystem 310 illustrated in FIG. 3, the example hardware accelerators 350*a-c* are configured to perform processing tasks on a data element, e.g., a data block and/or a data line. In some examples, the example hardware accelerators 350*a-c* are configured to perform image processing tasks, e.g., lens distortion correction (LDC), scaling (e.g., MSC), noise filtering (NF), dense optical flow (DOF), stereo screen door effect (SDE), or any other processing task suitable for image processing.

In some examples, an example first hardware accelerator 350*a* operates on a data block. In some examples, an example first hardware accelerator 350*a* operates on 16×16B data blocks, 32×32B data blocks, 64×32 data blocks, or any other data block size suitable for performing processing tasks. In some examples, at least an example first scheduler 382*a* coupled to an example first hardware accelerator 350*a* includes multiple consumer sockets 384*a* and/or multiple example producer sockets 386*a*, which may be connected to an example second scheduler 382*b*. For example, an ISS hardware accelerator may have 6 outputs (Y12, UV12, U8, UV8, S8, and H3A), and an LDC hardware accelerator may have two outputs (Y, UV) or three outputs (R, G, B).

In some examples, the example first consumer socket 384*a* and/or example first producer socket 386*a* of an example first hardware accelerator 350*a* is connected to the example second consumer socket 384*b* and/or example second producer socket 386*b* of an example second hardware accelerator 350*b* via the example crossbar 370 of the example HTS 380 to form a data flow chain. In some examples, the data flow chain is configured by the example MMR controller 392. In some examples, the example MMR controller 392 is software (SW) programmable. In some examples, an example first hardware accelerator 350*a* is configured to perform a first task on a data element independently from the example second hardware accelerator 350*b*, e.g., the example hardware accelerators 350*a-c* are configured to perform processing tasks on data elements in parallel.

While the example hardware acceleration subsystem 310 of FIG. 3 includes three example hardware accelerators 350*a-c* and one example DMA controller 340 for illustration purposes, the example hardware acceleration subsystem 310 may include any number and of example hardware accelerators 350*a-c* and/or DMA controllers 340. Further, the example hardware acceleration subsystem 310 may include different types of example hardware accelerators 350*a-c* and/or example hardware accelerators 350*a-c* that operate on different types of data, e.g., block or line, and/or perform different processing tasks, e.g., LDC, scaling, and noise filtering, thus allowing the user to customize the example hardware accelerator subsystem 310 for a variety of functions.

In the example hardware acceleration subsystem 310 illustrated in FIG. 3, the example schedulers 382*a-d* communicate with the corresponding example hardware accelerators 350*a-c* and the corresponding example DMA controller 340 to control the processing workflow of the example hardware accelerators 350*a-c* and the example DMA controller 340. In some examples, an example first scheduler 382*a* controls the workflow of the example first hardware accelerator 350*a*. In some examples, the example first scheduler 382*a* sends a start signal, e.g., a Tstart signal, to the example first hardware accelerator 350*a* to communicate to the example first hardware accelerator 350*a* to start processing a data element. In some examples, the example first hardware accelerator 350*a* sends a done signal, e.g., a Tdone signal, to indicate that the example first hardware accelerator 350*a* has finished processing a data element. In some examples, in response to receiving the Tdone signal, the example first scheduler 382*a* instructs the example DMA controller 340 to fetch another data element from the example external memory 330. In some examples, the example first scheduler 382*a* sends an initiate signal to the example first hardware accelerator 350*a* to indicate start-of-frame processing to the example hardware accelerator 350*a*. In some examples, the example first hardware accelerator 350*a* sends an end-of-frame signal to the example first scheduler 382*a* to communicate end-of-frame processing, e.g., to communicate the example first hardware accelerator has finished processing a frame.

In the example hardware acceleration subsystem 310 illustrated in FIG. 3, the examples schedulers 382*a-d* include respective example consumer sockets 384*a-d* to track consumed input data, e.g., data elements fetched from the example local memory 360, and respective example producer sockets 386*a-d* to track produced output data, e.g., data elements processed by the corresponding example hardware accelerators 350*a-c* and corresponding example DMA controller 340. In some examples, the example first hardware accelerator 350*a* includes multiple consumer sockets 384*a* and/or multiple producer sockets 386*a*. For example, the example first hardware accelerator may include an example first consumer socket 384*a* and/or an example first producer socket 386*a* to input/output data on a chroma channel and a second consumer socket and/or example producer socket to input/output data on a luma channel.

In some examples, the example consumer sockets 384*a-d* include consumer dependencies and the example producer sockets 386*a-d* include example producer dependencies. In some examples, the consumer dependencies and the producer dependencies are specific to the corresponding example hardware accelerator 350*a-c* and corresponding example DMA controller 340. In some examples, the example consumer sockets 384*a-d* are configured to generate a signal indicating consumption of produced data, e.g., a dec signal, in response to the corresponding example hardware accelerators 350*a-c* and the corresponding example DMA controller 340 consuming data. In some examples, the example producer sockets 386*a-d* are configured to generate a signal indicating the availability of consumable data, e.g., a pend signal, in response to the corresponding example hardware accelerators 350*a-c* and the corresponding example DMA controller 340 producing consumable data. In some examples, the example dec signal is routed to the corresponding example producer and the example pend signal is routed to the corresponding example consumer.

The example schedulers 382*a-c* of the example hardware acceleration subsystem 310 illustrated in FIG. 3 include example producer pattern adapters 390*a*, 390*b*, 390*c*, 390*d* coupled to the example producer sockets 386*a*, 386*b*, 386*c*, 386*d* to logically convert between line, block, and aggregated block formats In some examples, the example schedulers 382*a-d* enable aggregation of multiple sets of output data, e.g., a first data element and a second data element, when the first data element and the second data element are of the same data type, e.g., line to line, block to block. In some examples, the example schedulers 382a-d enable logical conversion of a data element and/or an aggregated data element between a first data type and a second data type, e.g., line to 2D block and block to 2D line. Thus, the example schedulers 382a-d enable at least four scenarios, e.g., line to line, line to 2D block, 2D block to line, and 2D block to 2D block.

The example hardware accelerator subsystem 310 illustrated in FIG. 3 includes example load store engines 352a, 352b, 352c coupled to the corresponding example hardware accelerators 350a-c. The example load store engines 352a, 352b, 352c are configured to aggregate at least a first data element, e.g., a first data block, and a second data element, e.g., a second data block, in the example local memory 360 to generate an aggregated data element, e.g., a superblock, and/or divide an aggregated data element into at least a first data element and a second data element. In some examples, an example first load store engine 352a is configured to aggregate a first data element and a second data element in the example local memory 360. In some examples, an example first load store engine 352a horizontally aggregates data elements based on a blocks per row (BPR) value programmed by a user into the example MMR controller 392 (e.g., CBUF_BPR), which enables tuning based on, for example, the example hardware accelerators 350a-c, output block size, DDR burst size, destination consumption pattern, and example local memory 360. In some examples, the example load store engines 352a-c enable software (SW) programmable circular buffer storage in the example local memory 360 for data aggregations based on block per row (BPR). In some examples, the BPR value is determined by software based on available memory in the example local memory 360 and/or memory allocated for an example hardware accelerator 350a-c in the example local memory 360. In some examples, the BPR value is hardcoded into the example MMR controller 392.

Figure 4:
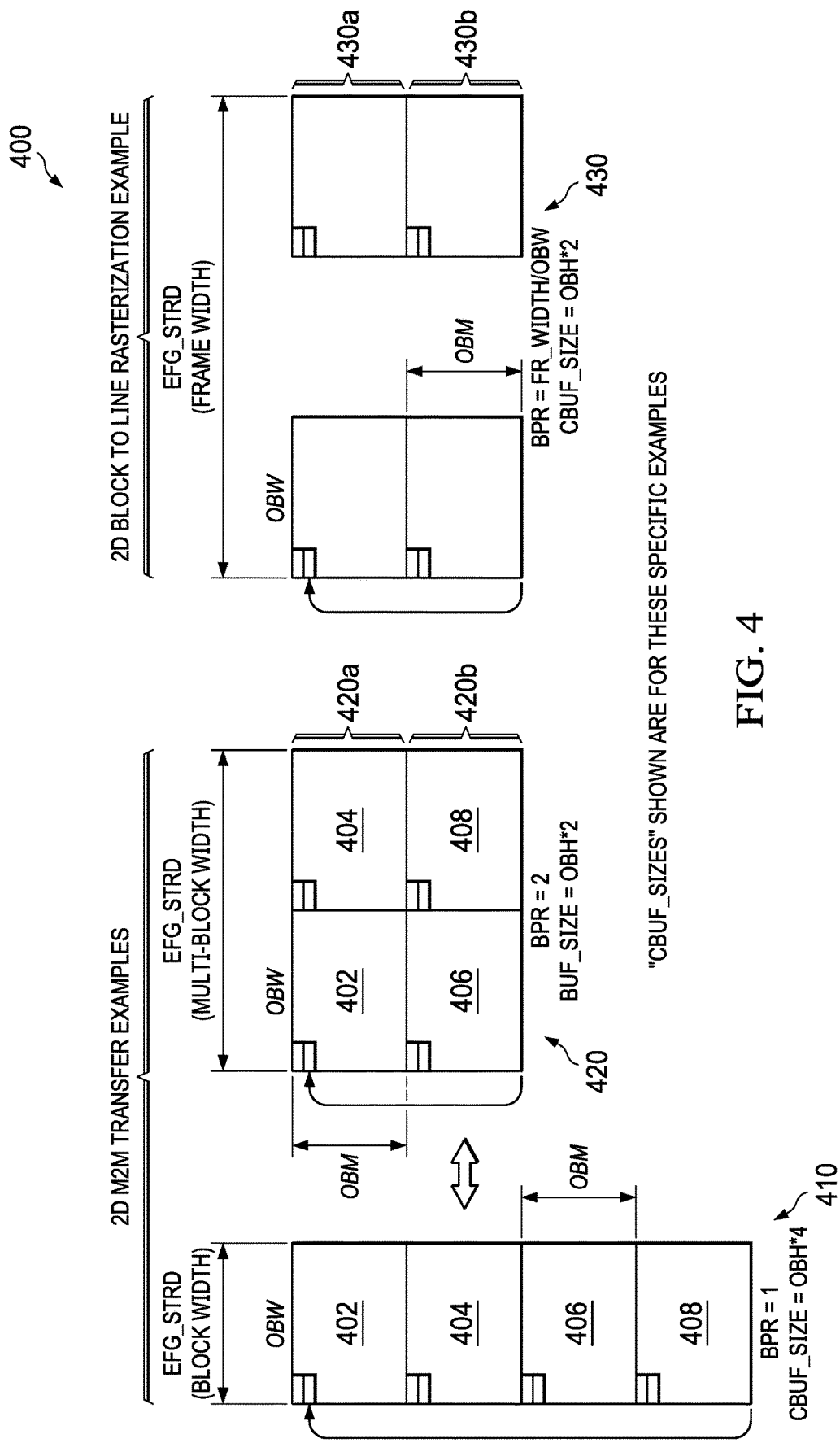
FIG. 4 is an example diagram illustrating an example aggregation of data elements to generate an aggregated data element.

FIG. 4 is an example diagram illustrating an example aggregation of data elements 402, 404, 406, 408 by an example load store engine 352a-c (FIG. 3) in the example local memory 360 (FIG. 3) to generate an aggregated data elements 420a, 420b, e.g., a superblocks 420a and 420b. In the example illustrated in FIG. 4, the example data elements 402, 404, 406, 408 are stored in a first configuration 410 in the local memory, e.g., the example local memory 360 of FIG. 3. In some examples, the example data elements 402, 404, 406, 408 are stored in the example local memory 360 (FIG. 3) in an example first configuration 410, for example, with a BPR value of one (e.g., one block width) and a buffer size of four (e.g., CBUF_SIZE=OBH*4). In some examples, the example data elements 402, 404, 406, 408 of FIG. 4 are aggregated horizontally based on a BPR value received from the example MMR controller 392. For example, the example first load store engine 352a may receive a BPR value of two from the example MMR controller 392 and horizontally aggregate the data elements 402, 404, 406, 408 in the example local memory 360 to generate an example second configuration 420 including two superblocks 420a, 420b, each superblock 420a, 420b having a width of two blocks (e.g., BPR=2). The example second configuration 420 illustrated in FIG. 4 has a buffer size of two (e.g., CBUF_SIZE=OBH*2). The example first load store engine 352a may be configured to horizontally aggregate any suitable number of blocks into an example superblock 420a, 420b having any suitable width as determined by the BPR value from the example MMR controller 392. In some examples, the example first load store engine 352a horizontally aggregates processed data blocks 402, 404, 406, 408 received from the example first hardware accelerator 350a, writes the processed data blocks 402, 404, 406, 408 to the example local memory 360, and aggregates the data blocks 402, 404, 406, 408 in the example local memory 360 to generate superblocks 420a, 420b. The example horizontally aggregated superblocks 420a, 420b illustrated in FIG. 4 may enable larger reads/writes between the example local memory 360 (FIG. 3) and the example external memory 330.

In some examples, the example load store engines 352a-c are configured to select individual data elements 402, 404, 406, 408 from the corresponding superblocks 420a, 420b. Thus, in some examples, the example load store engines 352a-c are configured to aggregate individual data elements 402, 404, 406, 408 to produce an aggregated data element 420a, 420b and/or select individual data elements 402, 404, 406, 408 from the corresponding superblocks 420, 420b depending on, for example, the data format on which the corresponding example hardware accelerators 350a-c are configured to operate and the format of the data transferred to the example local memory 360 from the example external memory 330.

In some examples, the example load store engines 352a-c receive processed data elements 402, 404, 406, 408 from the corresponding example hardware accelerator 350a-c, aggregate the processed data elements 402, 404, 406, 408 to generate an aggregated data element 420a, 420b, and write the aggregated data element 420a, 420b to the example local memory 360. In some examples, the example load store engines 352a-c receive a processed example aggregated data element 420a, 420b from a corresponding example hardware accelerator 350a-c, select an individual processed data element 402, 404, 406, 408 from the processed aggregated data elements 420a, 420b, and write the data element 402, 404, 406, 408 to the example local memory 360. In some examples, the data blocks may be aggregated into lines 430a, 430b (e.g., 2D block to line rasterization). In some examples, the data blocks may be aggregated into lines 430a, 430b by setting the BPR value as a function of the frame width (e.g., BPR=FR_WIDTH/OBW). In some examples, the rasterized data lines 430a, 430b may be transferred to the example external memory 330 by the example DMA controller 340 (FIG. 3), In some examples, the example first hardware accelerator 350a generates a done signal (e.g., a Tdone signal) in response to the example first hardware accelerator 350a completing the processing of an example data element 402, 404, 406, 408 (FIG. 4) and sends the Tdone signal to the example first scheduler 382a (FIG. 3). In some examples, in response to receiving a Tdone signal, the example first scheduler 382a instructs the example second hardware accelerator 350b to read the processed data element 402, 404, 406, 408 (FIG. 4) or aggregated data element 420a, 420b or 430a or 430b. In some examples, the example second hardware scheduler 350b consumes an aggregated data element with a full row of blocks (e.g., the aggregated data element 430a, 430b of FIG. 4). In some examples, in response to receiving a Tdone signal, the example first scheduler 382a (FIG. 3) instructs the example DMA controller 340 to write the processed data element 402, 404, 406, 408 (FIG. 4) or aggregated data element 420a or 420b or 430a or 430b from the example external memory 330 (FIG. 3).

In some examples, in response to the example first hardware accelerator 350a (FIG. 3) processing a data element 402, 404, 406, 408 (FIG. 4), the example first load store engine 352a (FIG. 3) increments a block count. In this manner, the example first load store engine 352a tracks the number of data elements 402, 404, 406, 408 (FIG. 4) processed by the example first hardware accelerator 350a (FIG. 3). In some examples, in response to the example first load store engine 352a determining that the block count is equal to the BPR value, the example first load store engine 352a aggregates the processed data elements 402, 404, 406, 408 (FIG. 4) in the local memory 360 to generate aggregated data elements 420a, 420b. In some examples, in response to the example first load store engine 352a determining that the block count is equal to the BPR value, the example first hardware accelerator 350a sends a Tdone signal to the example first scheduler 382a, at which point the example first scheduler 382a may instruct the example second hardware accelerator 350b or the example third hardware accelerator 350c to read the aggregated data element 420a, 420b from the example local memory 360. In some examples, in response to the Tdone signal, the example first scheduler 382a instructs the example DMA controller 340 to transfer the aggregated data element 420a, 420b, 430a or 430b to the example external memory 330 (FIG. 3).

As described above, the example first hardware accelerator 350a and/or the example first load store engine 352a may implement counting logic that includes incrementing a block count in response to the example hardware accelerator 352a processing a data element. In some examples, the example hardware acceleration subsystem 310 illustrated in FIG. 3 includes a generation mode parameter (e.g., a Tdone_gen_mode parameter) to enable the example hardware accelerator 350a-c to communicate with a corresponding example scheduler 382a-c at the block level, e.g., at the level of individual data elements 402, 404, 406, 408 (FIG. 4), or at the superblock level, e.g., at the level of aggregated data elements. In some examples, the generation mode parameter is MMR programmable and/or based on a BPR value. In some examples, in the first generation mode (e.g., when Tdone_gen_mode=0), the example hardware accelerators 350a-c communicate with the example schedulers 382a-c at the block level, e.g., an example hardware accelerator 350a-c sends a Tdone signal to the corresponding example scheduler 382a-c upon processing an individual data element 402, 404, 406, 408 (FIG. 4). In some examples, in the second generation mode (e.g., when Tdone_gen_mode=1), the example hardware accelerators 350a-c communicate with the example schedulers 382a-c at the superblock level, e.g., an example hardware accelerator 350a-c sends a Tdone signal to the corresponding example scheduler 382a-c upon processing a superblock based on the BPR value (e.g., when the example hardware accelerator 350a-c has processed a number of data elements 402, 404, 406, 408 equal to the BPR value). For example, if the BPR value is two (e.g., the superblock 420a of FIG. 4), and if an example hardware accelerator 350a-c is processing the superblock 420a (FIG. 4) is communicating with the corresponding example scheduler 382a-c (e.g., Tdone_gen_mode=1), the example hardware accelerator 350a-c sends a Tdone signal to the corresponding example scheduler 382a-c upon processing two data elements 402, 404.

The flexibility of communicating at the block level or the superblock level prevents the example schedulers 382a-c and/or the example HTS 380 from triggering a DMA transfer after the example first hardware accelerator 350a processes a single data block 402, 404, 406, 408 (FIG. 4) of a superblock 420a, 420b. For example, if the example first load store engine 352a horizontally aggregates two data blocks 402, 404 (FIG. 4) into a superblock, e.g., the example superblock 420a of FIG. 4, based on a BPR value of two, and the corresponding example hardware accelerator 350a communicates with the example first scheduler 382a and/or the example HTS 380 at the block level (e.g., the first generation mode), the example first scheduler 382a and/or the example HTS 380 may trigger a DMA transfer after one data block 402 or 404 is processed instead of waiting until both of the data blocks 402, 404 in the aggregated data block 420a are processed.

In some examples, an aggregated data element, e.g., the example aggregated data elements 430a, 430b of third configuration 430, has a BPR value equal to the frame width of an input frame being processed by the example hardware accelerator subsystem 310 of FIG. 3 (e.g., BPR=FR_WIDTH/OBW). In situations where the frame width of the input frame is not a multiple of the BPR value (e.g., when frame width=10 blocks and BPR value=4), an aggregated data element may 430 a include an end of row (EOR) trigger mode (e.g., a partial_bpr_trigmode) to account for situations where the frame width of an input frame is not a multiple of the superblock size. For example, if the example hardware accelerator 350a-c is operating in EOR trigger mode while the BPR value is four and the remaining superblock buffer has two blocks, then the number of blocks in the superblock buffer is 50% of the BPR value and the example hardware accelerator 350a-c will send an EOR trigger to the corresponding example scheduler 382a-c and/or the example HTS 380 after processing two blocks in the superblock buffer at the end of the row. In some examples, the example corresponding scheduler 382a-c and/or the example HTS 380 triggers the example DMA controller 340 to transfer the EOR superblock to the example external memory 330 via a separate DMA channel when the example hardware accelerator 350a is operating in EOR trigger mode (e.g., partial_bpr_trigmode=1). In some examples, the example first load store engine 352a communicates with the example first scheduler 382a via a partial BPR count (e.g., a partial_bpr_count mode) to indicate a remaining block count in the EOR superblock buffer.

By combining multiple data blocks in a horizontal direction as disclosed herein and enabling the example hardware accelerators 350a-c to communicate at the block level and/or the superblock level, the example load store engines 352a-c enable larger reads and writes to the example local memory 360 from/to the example external memory 330, thereby improving DDR efficiency. With larger memory requests (up to frame width) DDR page opening/closing is significantly reduced.

Figure 5:
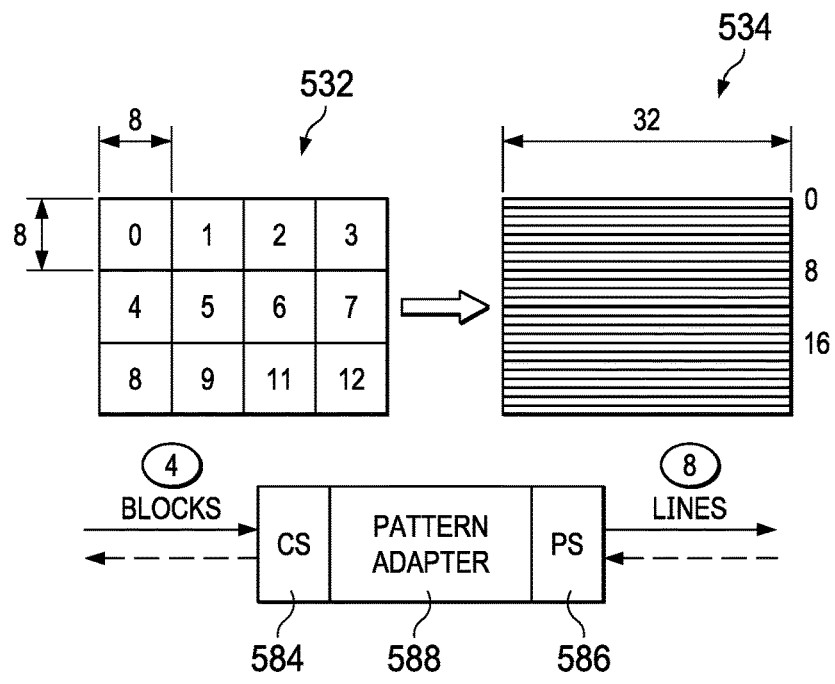
FIG. 5 is an example diagram illustrating an example pattern adaptation process implemented by an example pattern adapter to convert a data block to a line data element.

FIG. 5 is an example diagram illustrating an example pattern adaptation process 500 implemented by an example pattern adapter to logically convert a 24×32Bytesdata block 532 to a 24-line data element 534. In the example pattern adaptation diagram 500 of FIG. 5, an example consumer socket 584 gives permission for an example first hardware accelerator 350a and/or an example first load store engine 352a to read from the example memory local memory 360 and tracks the number the times the example first hardware accelerator 350a and/or an example first load store engine 352a reads from the example local memory 360. For example, in the example illustrated in FIG. 5, the example pattern adapter 588 may logically convert the 24×32 data block 532 into a 24-line data element. In some examples, an example hardware accelerator, e.g., the example first hardware accelerator 350a of FIG. 3, performs a processing task on the 24-line data element 534.

In some examples, the example scheduler, e.g., the example first scheduler 382a of FIG. 3, reads a Tdone signal from the example first hardware accelerator 350a and, in response, the example pattern adapter 588 logically converts the 24-line data element to a 24×32B data block and the example producer socket 586 produces the processed data block as output data for consumption by another hardware accelerator and/or transfer to the example external memory 330 by the example DMA controller, e.g., the example DMA controller 340 of FIG. 3.

By converting data elements between line, block, and superblock, the example producer pattern adapters 390*a-d* of FIG. 3 and/or the example pattern adapter 588 of FIG. 5 enable the example hardware acceleration subsystem 310 (FIG. 3) to process data elements using corresponding example hardware accelerators 350*a-c* and/or a corresponding example DMA controller 340 that produce different types of output, thereby enabling complex user-defined multiple producer and multiple consumer hardware acceleration schemes for various functions while maintaining improved efficiency in the DDR external memory (e.g., the example external memory 330 of FIG. 3).

Figure 6:
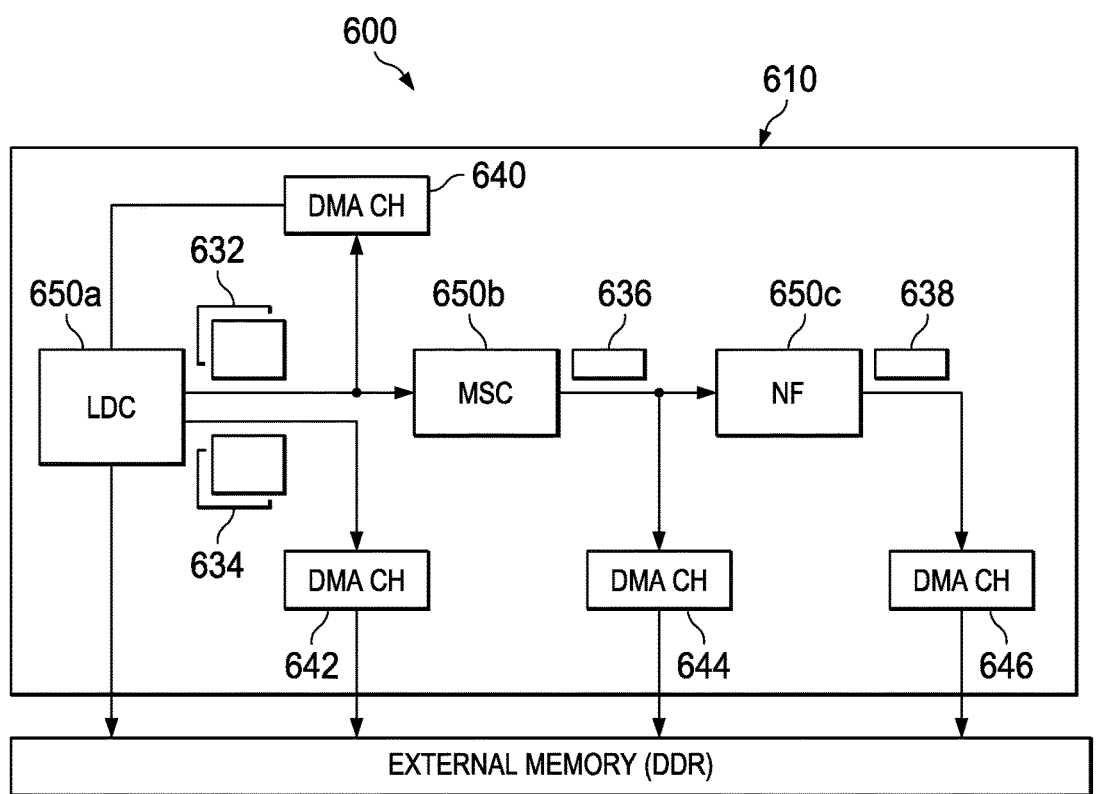
FIG. 6 is an example user-defined graph illustrating an example multiple consumer/multiple producer hardware acceleration subsystem for image, vision, and/or video processing.

FIG. 6 is an example user-defined graph 600 illustrating an example multiple consumer/multiple producer hardware acceleration sub-system 610 for image, vision, and/or video processing. The example hardware acceleration sub-system 610 illustrated in FIG. 6 includes an example lens distortion correction (LDC) hardware accelerator 650*a* to perform lens distortion correction on a data block, an example scaling (MSC) hardware accelerator 650*b* to perform scaling on a data line, an example noise filtering (NF) hardware accelerator 650*c* to perform noise filtering on a data line, an example first DMA controller 640 in communication with the example LDC hardware accelerator 650*a* and an example DDR external memory 630, an example second DMA controller 642 in communication with the example LDC hardware accelerator 650*a* and the example DDR external memory 630, an example third DMA controller 646 in communication with the example MSC hardware accelerator 650*b*, the example NF hardware accelerator 650*c*, and the example DDR external memory 630, and an example fourth DMA controller 648 in communication with the example NF hardware accelerator 650*c* and the example DDR external memory 630.

In the example user-defined hardware acceleration sub-system 610 illustrated in FIG. 6, the example LDC hardware accelerator 650*a* produces multiple outputs including data blocks 632 consumed, for example, by the example first DMA controller 640. In the example of FIG. 6, the example MSC hardware accelerator 650*b* consumes a set of data lines based on the output of the example LDC hardware accelerator 650*a* and the example second DMA controller 642 consumes data blocks 634. In the example of FIG. 6, the example MSC hardware accelerator 650*b* consumes a set of data lines based on the output of the example LDC hardware accelerator 650*a*, performs a scaling operation on the data lines, and produces the data line element 636 which is consumed by the example NF hardware accelerator 650*c* and the example third DMA controller 644. In the example of FIG. 6, the example NF hardware accelerator 650*c* consumes the data line element 636, performs a noise filtering operation on the data line element 636, and produces a data line element 638 which is consumed by the example fourth DMA controller 646. In the example of FIG. 6, the example first DMA controller 640, the example second DMA controller 642, the example third DMA controller 644, and the example fourth DMA controller 646 are configured to write respective data elements 632, 634, 636, 638 to the example DDR external memory 630.

Figure 7:
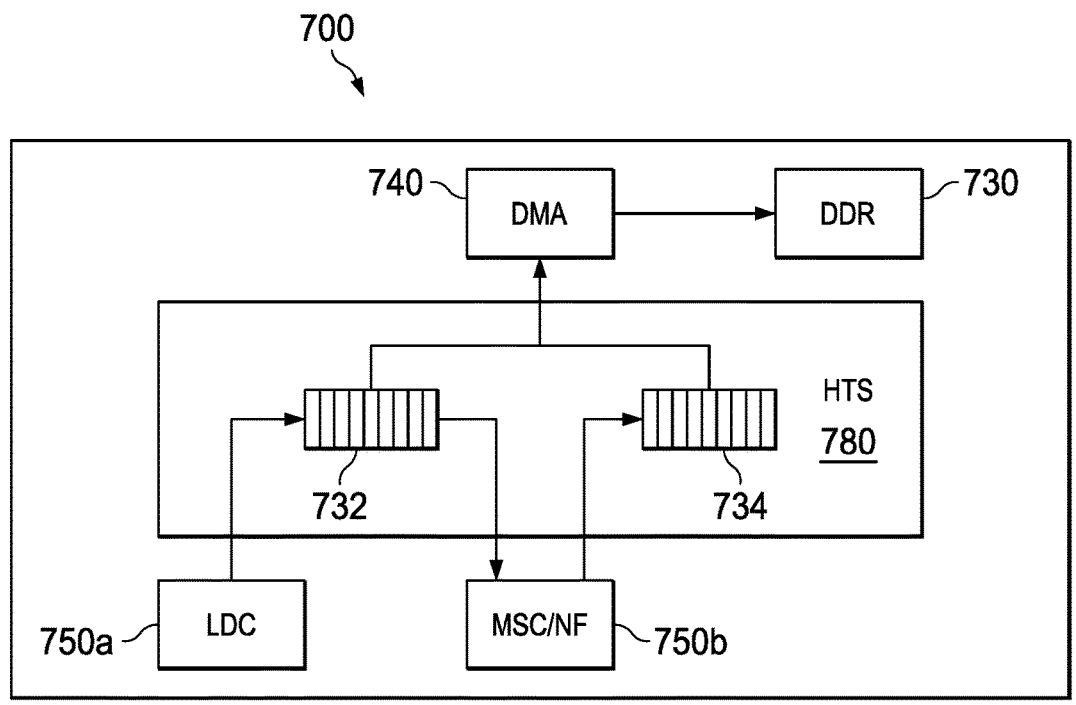
FIG. 7 is an example diagram illustrating an example multiple consumer/multiple producer hardware acceleration scheme.

FIG. 7 is an example diagram 700 illustrating an example multiple consumer/multiple producer hardware acceleration scheme. The example hardware acceleration sub-system 710 illustrated in FIG. 7 includes an example DDR external memory 730, an example DMA controller 740, an example LDC hardware accelerator 750*a*, an example MSC/NF hardware accelerator 750*b*, and an example HTS 780. In the example hardware acceleration subsystem 710 of FIG. 7, the example LDC hardware accelerator 750 is configured to perform lens distortion correction operations on data to produce data elements 732. In the example hardware acceleration subsystem 710, the example MSC/NF hardware accelerator 750*b* is configured to consume the data elements 732, perform scaling and noise filtering operations on the data elements 732, and produce the data elements 734. In the example hardware acceleration subsystem 710, the example DMA controller 740 is configured to consume the data elements 732, 734 produced by the example LDC hardware accelerator 750*a* and the example MSC hardware accelerator 750*b*, respectively, and write the data elements 732, 734 to the example DDR external memory 730.

Aggregation requirements may be different based on the consumer of the data considering local memory availability. For example, an MSC hardware accelerator 650*b* (FIG. 6) may need a full set line data being available whereas a DMA CH write out may be fine with aggregating a few blocks for DDR bandwidth savings. To enable different aggregations, each output channel may be programmed in the LSE 352*a* to include a different BPR value.

Figure 8:
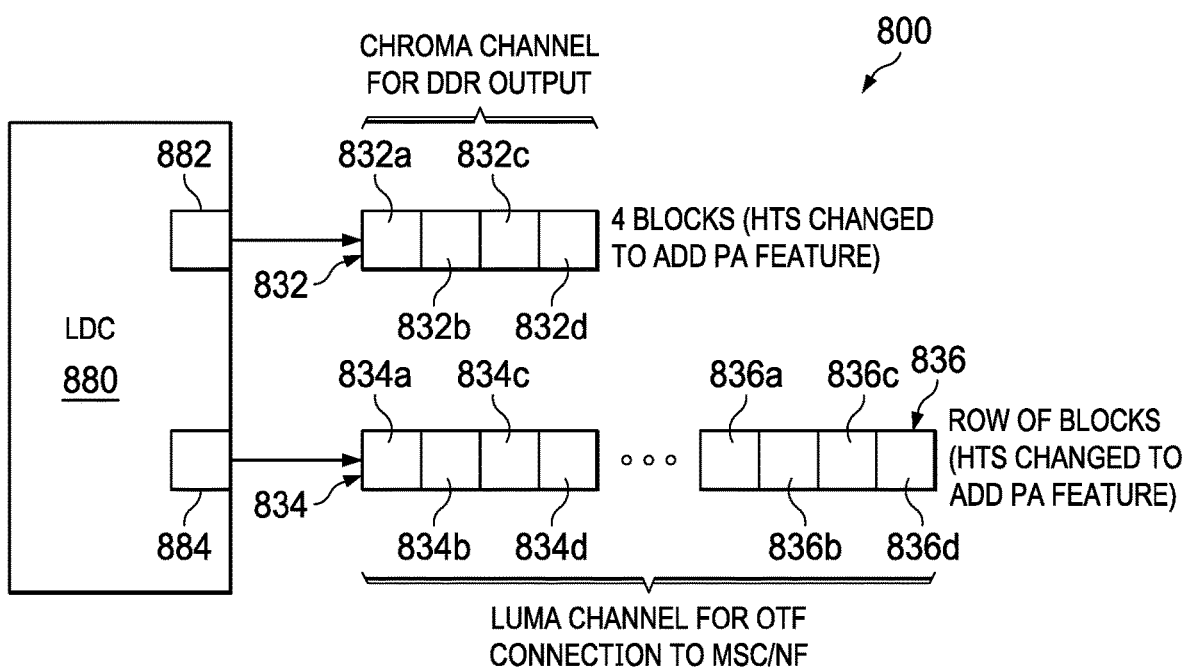
FIG. 8 illustrates an example multi-producer lens distortion correction (LDC) hardware accelerator to output a first data element on a first channel and a second data element on a second channel.

FIG. 8 illustrates an example multi-producer LDC hardware accelerator 880 to output a first aggregated data element 832 on a first channel, e.g., a chroma channel, and a second aggregated data element 834 on a second channel, e.g., a luma channel. In the example illustrated in FIG. 8, the first channel is associated with a first BPR value (e.g., a first BPR value of four) and the second channel is associated with a second BPR value (e.g., a BPR value equal to the frame width). In some examples, the first BPR value and/or second BPR value is based on a number of blocks in a frame row, a number of pixels in a frame row, and/or a number of bytes in a frame row. In the example illustrated in FIG. 8, the first aggregated data element 832 is output to the external DDR (e.g., the example external memory 330 of FIG. 3) and the second data element 834 is output to a second hardware accelerator (e.g., an MSC/NF hardware accelerator). Thus, examples disclosed herein enable separate, asymmetrical aggregation of data elements (e.g., on separate data channels).

Figure 9:
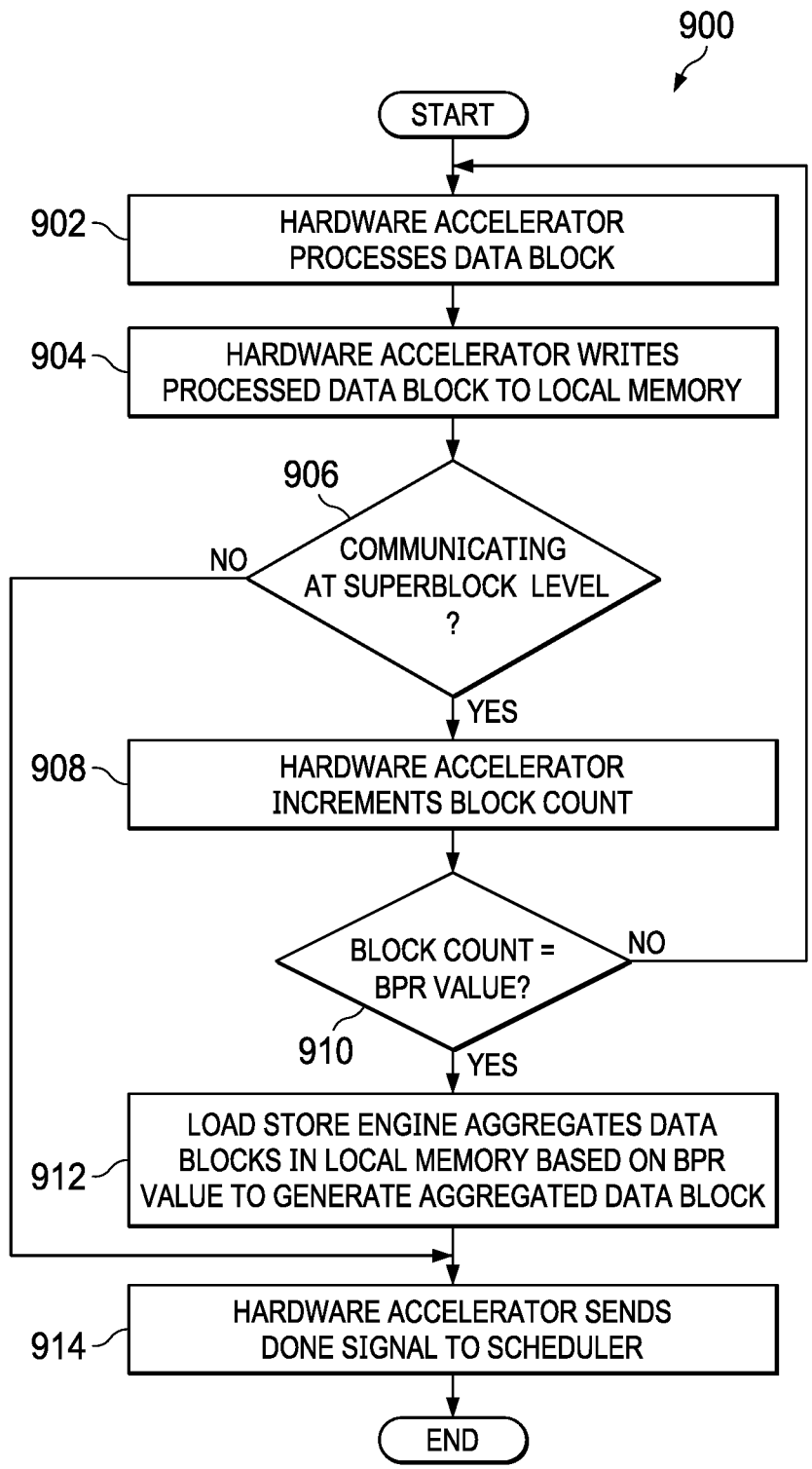
FIG. 9 is a flowchart representative of machine readable instructions which may be executed to implement the example hardware acceleration subsystem of FIG. 3.

While an example manner of implementing the hardware acceleration subsystem 310 of FIG. 3 is illustrated in FIG. 9, one or more of the elements, processes and/or devices illustrated in FIG. 9 may be combined, divided, re-arranged, omitted, eliminated and/or implemented in any other way. Further, the example hardware accelerators 350*a-c*, the example schedulers 382*a-d*, the example load store engines 352*a-c*, the example producer pattern adapters 390*a-d*, the example DMA controller 340, the example local memory 360 and/or, more generally, the example hardware acceleration subsystem of FIG. 3 may be implemented by hardware, software, firmware and/or any combination of hardware, software and/or firmware. Thus, for example, any of the example hardware accelerators 350*a-c*, the example schedulers 382*a-d*, the example load store engines 352*a-c*, the example producer pattern adapters 390*a-d* the example DMA controller 340, the example local memory 360 and/or, more generally, the example hardware acceleration subsystem 310 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hardware accelerators 350a-c, the example schedulers 382a-d, the example load store engines 352a-c, the example producer pattern adapters 390a-d, the example DMA controllers 340, and the example local memory 360 is/are hereby expressly defined to include a non-transitory computer readable storage device or storage disk such as a memory, a digital versatile disk (DVD), a compact disk (CD), a Blu-ray disk, etc. including the software and/or firmware. Further still, the example hardware acceleration subsystem 310 of FIG. 3 may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the hardware acceleration subsystem 310 of FIG. 3 is shown in FIG. 9. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 9, many other methods of implementing the example hardware acceleration subsystem 310 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of machine readable instructions which may be executed to implement the example hardware acceleration subsystem 310 of FIG. 3 to enable data aggregation and pattern adaptation.

At block 902, a hardware accelerator (e.g., a lens distortion correction hardware accelerator) processes a data block. For example, the example first hardware accelerator 350a (FIG. 3) may process a data block 402 (e.g., from the first configuration 410 of FIG. 4).

At block 904, the hardware accelerator writes the processed data block to the local memory. For example, the example first hardware accelerator 350a may write the processed data block 402 (FIG. 4) to the example local memory 360 (FIG. 3).

At block 906, the load store engine coupled to the hardware accelerator determines whether the hardware accelerator is communicating at the block level or the superblock level. For example, the example first load store engine 352a may determine whether the example first hardware accelerator 350a is communicating at the block level (e.g., Tdone_gen_mode=0) or at the superblock level (e.g., Tdone_gen_mode=1).

If the load store engine determines the hardware accelerator is communicating at the block level (block 906), the machine readable instructions 900 advance to block 914 where the hardware accelerator sends a done signal to the corresponding scheduler. For example, if the example first load store engine 352a determines that the example first hardware accelerator 350a is communicating at the block level (e.g., Tdone_gen_mode=0), the example first hardware accelerator 350a sends a done signal (e.g., a Tdone signal) to the example first scheduler 382a. The program ends.

At block 916, the scheduler triggers a second hardware accelerator (e.g., a scaling hardware accelerator) to read the processed data block from the local memory or triggers a DMA controller to write the processed data block to the example external memory 330 (FIG. 3). For example, the example first scheduler 382a may trigger the example second hardware accelerator 350b to read the processed data block 402 from the example local memory 360 or trigger the example DMA controller 340 to write the processed data block 402 to the example external memory 330 (FIG. 3) (block 916).

If the load store engine determines that the hardware accelerator is communicating at the superblock level (e.g., Tdone_gen_mode=1) (block 906), the hardware accelerator increments a block count. For example, if the example first load store engine 352a determines that the example first hardware accelerator 350a is communicating at the superblock level (e.g., Tdone_gen_mode=1) (block 906), the example first hardware accelerator 350a may increment a block count by one.

At block 910, the load store engine determines whether the block count is equal to the BPR value. If the load store engine determines that the block count is not equal to the BPR value (e.g., the block count is less than the BPR value) (block 910), the machine readable instructions return to block 902 and the hardware accelerator processes another data block (block 902). For example, if the BPR value is two (e.g., BPR=2) and the block count is one (e.g., the hardware accelerator has processed one data block 402), then the example load store engine 352a may determine that the block count is not equal to the BPR value (block 910) and the example machine readable instructions 900 return to block 902 where the example first hardware accelerator 350a processes another data block 404 (e.g., from the first configuration 410 of FIG. 4).

If the load store engine determines that the block count is equal to the BPR value (block 910), the load store engine aggregates the data blocks in the local memory based on the BPR value to generate an aggregated data block (block 912). For example, if the BPR value is two (e.g., BPR=2) and the block count is two (e.g., the example first hardware accelerator 350a has processed two data blocks 402, 404), the example first load store engine 352a aggregates the data blocks 402, 404 and generates an aggregated data block (e.g., superblock) 420a.

At block 914, the hardware accelerator sends a done signal to the corresponding scheduler. For example, the example first hardware accelerator 350a may send a done signal (e.g., a Tdone signal) to the example first scheduler 382a.

At block 916, in response to the done signal, the scheduler triggers a second hardware accelerator to read the aggregated data block from the local memory or triggers the DMA controller to write the aggregated data element to the example external memory 330 (FIG. 3). For example, in response to the Tdone signal, the example first scheduler 382a may trigger the example second hardware accelerator 350b to read the superblock 420a from the example local memory 360 or trigger the example DMA controller 340 to write the superblock 420a to the example external memory 330 (FIG. 3). The program ends.

While the example first load store engine 352a aggregates the data blocks 402, 404 (block 912) when communicating at the superblock level in FIG. 9, in some examples, the example first load store engine 352a aggregates the data blocks 402, 404 when communicating at the block level. Thus, in some examples, the example first load store engine 352a aggregates the data blocks 402, 404 irrespective of whether the example first hardware accelerator is communicating at the block level or at the superblock level. In some examples, the example first load store engine 352a aggregates the data blocks 402, 404 such that the example first load store engine 352a writes the data blocks to the example local memory 360 as a single block (e.g., the address of data element 404 is continuous from data element 402).

Figure 10:
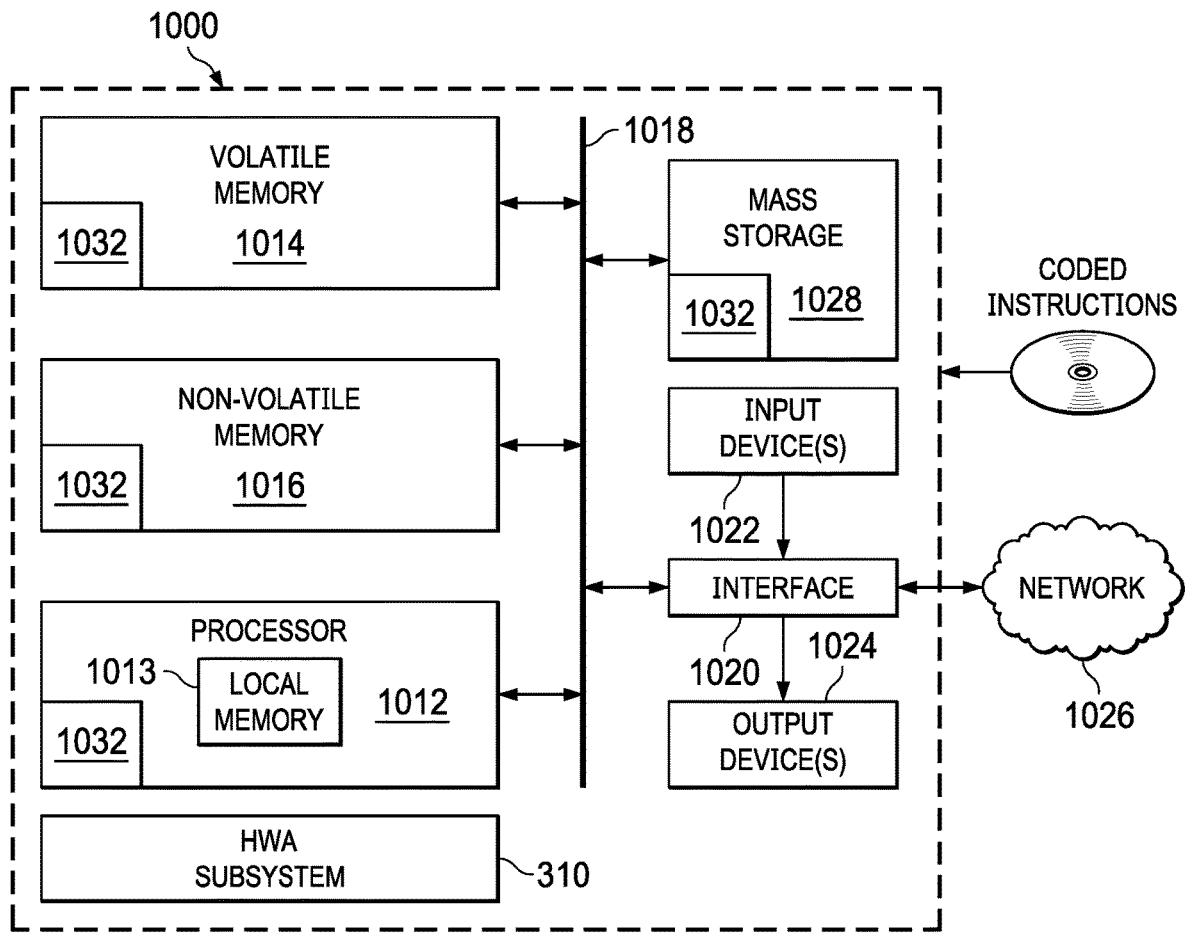
FIG. 10 is a block diagram of an example processor platform structured to execute the instructions of FIG. 9 to implement the apparatus of FIG. 3.

FIG. 10 is a block diagram of an example processor platform 1000 structured to execute the instructions of FIG. 9 to implement the apparatus of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes the example HWA sub-system 310 described in connection to FIG. 3.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 9 may be stored in the mass storage device 1028, in the volatile memory 1014, in the non-volatile memory 1016, and/or on a removable non-transitory computer readable storage medium such as a CD or DVD.

Figure 11:
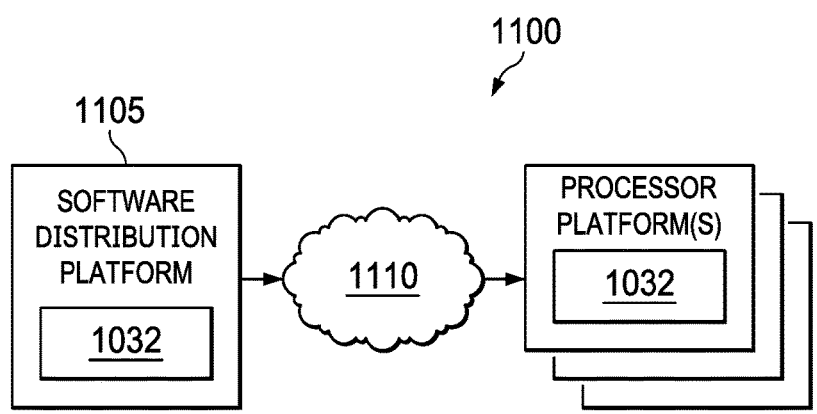
FIG. 11 is a block diagram of an example software distribution platform to distribute software (e.g., software corresponding to the example computer readable instructions of FIG. 9) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1105 to distribute software such as the example computer readable instructions 1032 of FIG. 9 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1032, which may correspond to the example computer readable instructions 1032 of FIG. 9, as described above. The one or more servers of the example software distribution platform 1105 are in communication with a network 1110, which may correspond to any one or more of the Internet and/or any of the example networks 1026 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032 from the software distribution platform 1105. For example, the software, which may correspond to the example computer readable instructions 1032 of FIG. 9, may be downloaded to the example processor platform 1000, which is to execute the computer readable instructions 1032 to implement the apparatus of FIG. 3. In some examples, one or more servers of the software distribution platform 1105 periodically offer, transmit, and/or force updates to the software (e.g., the example computer readable instructions 1032 of FIG. 9) to ensure improvements, patches, updates, etc. are distributed and applied to the software at the end user devices.

From the foregoing, it will be appreciated that example systems, methods, and apparatus have been disclosed that enable data aggregation and pattern adaptation in hardware acceleration subsystems. The disclosed methods, apparatus and articles of manufacture improve the efficiency of using a computing device by improving the efficiency of the external memory and enabling user-defined multiple producer and multiple consumer hardware acceleration schemes. The disclosed methods, apparatus and articles of manufacture are accordingly directed to one or more improvement(s) in the functioning of a computer.

Examples disclosed herein include a System on Chip (SoC) comprising a first scheduler, a first hardware accelerator coupled to the first scheduler to process at least a first data element and a second data element, and a first load store engine coupled to the first hardware accelerator, the first load store engine configured to communicate with the first scheduler at a superblock level by sending a done signal to the first scheduler in response to determining that a block count is equal to a first BPR value and aggregate the first data element and the second data element based on the first BPR value to generate a first aggregated data element.

In some examples, the first load store engine increments the block count in response to the first hardware accelerator processing the first data element and increments the block count in response to the first hardware accelerator processing the second data element.

In some examples, the first scheduler instructs a DMA controller to store the first aggregated data element to an external memory in response to receiving the done signal from the first hardware accelerator.

In some examples, the first scheduler instructs a second hardware accelerator to read the first aggregated data element in response to receiving the done signal from the first hardware accelerator.

In some examples, the first load store engine is configured to communicate with the first scheduler at a block level by sending a done signal to the first scheduler in response to the first hardware accelerator processing the first data block.

In some examples, the first BPR value is associated with a first data channel.

In some examples, the SoC includes a software (SW) programmable Memory Mapped Register (MMR) coupled to the first scheduler, the MMR to provide at least the first BPR value to the first load store engine.

In some examples, the first load store engine is configured to aggregate at least a third data element and a fourth data element based on a second BPR value to generate a second aggregated data element.

In some examples, the second BPR value is associated with a second data channel.

In some examples, the first load store engine enables software (SW) programmable circular buffer storage in a local memory for data aggregations based on at least the first BPR value.

In some examples, the first scheduler includes a first consumer socket to track input data consumed by the first hardware accelerator and a first producer socket to track output data produced by the hardware accelerator.

In some examples, the first scheduler includes a first producer pattern adapter coupled to the first producer socket.

Examples disclosed herein include a method comprising processing, by a first hardware accelerator, a first data element and a second data element; sending, by a first load store engine, a done signal to a first scheduler in response to determining that a block count is equal to a first BPR value; and aggregating, by the first load store engine, the first data element and the second data element based on the first BPR value to generate a first aggregated data element.

In some examples, the method further includes incrementing, by the first load store engine, the block count in response to the first hardware accelerator processing the first data element and incrementing, by the first load store engine, the block count in response to the first hardware accelerator processing the second data element.

In some examples, the method further includes instructing, by the first scheduler, a DMA controller to store the first aggregated data element to an external memory in response to receiving the done signal from the first hardware accelerator.

In some examples, the method further includes instructing, by the first scheduler, a second hardware accelerator to read the first aggregated data element in response to receiving the done signal from the first hardware accelerator.

In some examples, the first BPR value is associated with a first data channel.

In some examples, the method further includes aggregating, by the first load store engine, at least a third data element and a fourth data element based on a second BPR value to generate a second aggregated data element.

In some examples, the second BPR value is associated with a second data channel.

Examples disclosed herein include a non-transitory computer readable medium comprising computer readable instructions that, when executed, cause at least one processor to at least process, by a first hardware accelerator, a first data element and a second data element; send, by a first load store engine, a done signal to a first scheduler in response to determining that a block count is equal to a first BPR value; and aggregate, by the first load store engine, the first data element and the second data element based on the first BPR value to generate a first aggregated data element.

In some examples, the computer readable instructions are further to cause the at least one processor to at least increment, by the first load store engine, the block count in response to the first hardware accelerator processing the first data element and increment, by the first load store engine, the block count in response to the first hardware accelerator processing the second data element.

In some examples, the computer readable instructions are further to cause the at least one processor to at least instruct, by a first scheduler, a DMA controller to store the first aggregated data element to an external memory in response to receiving the done signal from the first hardware accelerator.

In some examples, the computer readable instructions are further to cause the at least one processor to at least instruct, by a first scheduler, a second hardware accelerator to read the first aggregated data element in response to receiving the done signal from the first hardware accelerator.

In some examples, the computer readable instructions are further to cause the at least one processor to at least send, by the first hardware accelerator, a done signal to the first scheduler in response to the first hardware accelerator processing the first data block.

In some examples, the first BPR value is associated with a first data channel.

In some examples, the computer readable instructions are further to cause the at least one processor to at least aggregate, by the first load store engine, at least a third data element and a fourth data element based on a second BPR value to generate a second aggregated data element.

In some examples, the second BPR value is associated with a second data channel.

Examples disclosed herein include an apparatus including means for processing a first data element and a second data element, means for sending a done signal to a first scheduler in response to determining that a block count is equal to a first BPR value, and means for aggregating the first data element and the second data element based on the first BPR value to generate a first aggregated data element.

In some examples, the apparatus further includes means for incrementing the block count in response to a first hardware accelerator processing the first data element and means for incrementing the block count in response to the first hardware accelerator processing the second data element.

In some examples, the apparatus further includes means for instructing a DMA controller to store the first aggregated data element to an external memory in response to receiving the done signal from the first hardware accelerator.

In some examples, the apparatus further includes means for instructing a second hardware accelerator to read the first aggregated data element in response to receiving the done signal from the first hardware accelerator.

In some examples, the apparatus further includes means for sending a done signal to the first scheduler in response to the first hardware accelerator processing the first data block.

In some examples, the first BPR value is associated with a first data channel.

In some examples, the apparatus further includes means for aggregating at least a third data element and a fourth data element based on a second BPR value to generate a second aggregated data element.

In some examples, the second BPR value is associated with a second data channel.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A circuit device comprising:
   a memory;
   a first hardware accelerator coupled to the memory and configured to:
     process a set of data to produce a set of data elements; and
     cause the set of data elements to be stored in the memory;
   a second hardware accelerator coupled to the memory;
   a load store circuit coupled between the first hardware accelerator and the memory and configured to:
     determine whether a count of elements in the set of data elements meets an aggregation threshold; and
     based on the count of elements meeting the aggregation threshold, cause the second hardware accelerator to process the set of data elements.

2. The circuit device of claim 1 further comprising a scheduler circuit coupled to the first hardware accelerator and the second hardware accelerator, wherein the load store circuit is configured to cause the second hardware accelerator to process the set of data elements by causing a done signal to be provided to the scheduler circuit.

3. The circuit device of claim 1, wherein the load store circuit is configured to, based on the count of elements meeting the aggregation threshold, aggregate the set of data elements into an aggregated data element.

4. The circuit device of claim 3, wherein the load store circuit is configured to cause the set of data elements to be stored in the memory as the aggregated data element.

5. The circuit device of claim 1 further comprising a memory-mapped register configured to store the aggregation threshold.

6. The circuit device of claim 1, wherein the set of data is a set of image data, and each data element of the set of data elements is a two-dimensional block of image data.

7. The circuit device of claim 1, wherein:
   the set of elements is a first set of elements and is associated with a first channel;
   the aggregation threshold is a first aggregation threshold and is associated with the first channel;
   the first hardware accelerator is configured to:
     produce a second set of data elements that is associated with a second channel; and
     cause the second set of data elements to be stored in the memory;
   the load store circuit is further configured to:
     determine whether a count of elements in the second set of data elements meets a second aggregation threshold that is associated with the second channel and is different from the first aggregation threshold; and
     based on the count of elements in the second set of data meeting the second aggregation threshold, cause the second hardware accelerator to process the second set of data elements.

8. The circuit device of claim 7, wherein the first channel is a chroma channel, and the second channel is a luma channel.

9. The circuit device of claim 1, wherein each data element of the set of data elements has a size from a group consisting of: 16×16 bytes, 32×32 bytes, and 64×32 bytes.

10. A circuit device comprising:
    a first memory;
    a direct memory access (DMA) circuit coupled to the first memory and configured to couple to a second memory;
    a hardware accelerator coupled to the first memory and configured to:
      perform an operation on a set of data to produce a set of data elements; and
      cause the set of data elements to be stored in the first memory;
    a load store circuit coupled between the hardware accelerator and the first memory and configured to:
      determine whether a count of elements in the set of data elements meets an aggregation threshold; and
      based on the count of elements meeting the aggregation threshold, cause the DMA circuit to cause the set of data elements to be stored in the second memory.

11. The circuit device of claim 10 further comprising a scheduler circuit coupled to the DMA circuit and to the hardware accelerator, wherein the load store circuit is configured to cause the DMA circuit to cause the set of data elements to be stored in the second memory by causing a done signal to be provided to the scheduler circuit.

12. The circuit device of claim 10, wherein the load store circuit is configured to, based on the count of elements meeting the aggregation threshold, aggregate the set of data elements into an aggregated data element.

13. The circuit device of claim 12, wherein the load store circuit is configured to cause the set of data elements to be stored in the first memory as the aggregated data element.

14. A method comprising:
processing, using a first processing circuit, first and second sets of data to produce first and second sets of data elements associated with first and second channels, respectively;
storing the first and second sets of data elements in a memory;
determining whether a count of elements of the first set of data elements meets a first aggregation threshold associated with the first channel;
determining whether a count of elements of the second set of data elements meets a second aggregation threshold associated with the second channel;
based on the count of elements of the first set of data elements meeting the first aggregation threshold, processing the first set of data elements using a second processing circuit; and
based on the count of elements of the second set of data elements meeting the second aggregation threshold, processing the second set of data elements using the second processing circuit.

15. The method of claim 14 further comprising, based on the count of elements of the set of data elements meeting the aggregation threshold, providing a done signal to a scheduler circuit, wherein the processing of the set of data elements using the second processing circuit is further based on the done signal.

16. The method of claim 14 further comprising based on the count of elements of the set of data elements meeting the aggregation threshold, aggregating the set of data elements in the memory to produce an aggregated data element.

17. The method of claim 14, wherein the set of data is a set of image data, and each data element of the set of data elements is a two-dimensional block of image data.

18. The method of claim 14, wherein the first and second aggregation thresholds are different.

19. The method of claim 18, wherein the first channel is a chroma channel, and the second channel is a luma channel.

20. The method of claim 14, wherein each data element of the set of data elements has a size from a group consisting of: 16×16 bytes, 32×32 bytes, and 64×32 bytes.

* * * * *